Jan. 31, 1967     A. F. HICKMAN     3,301,573

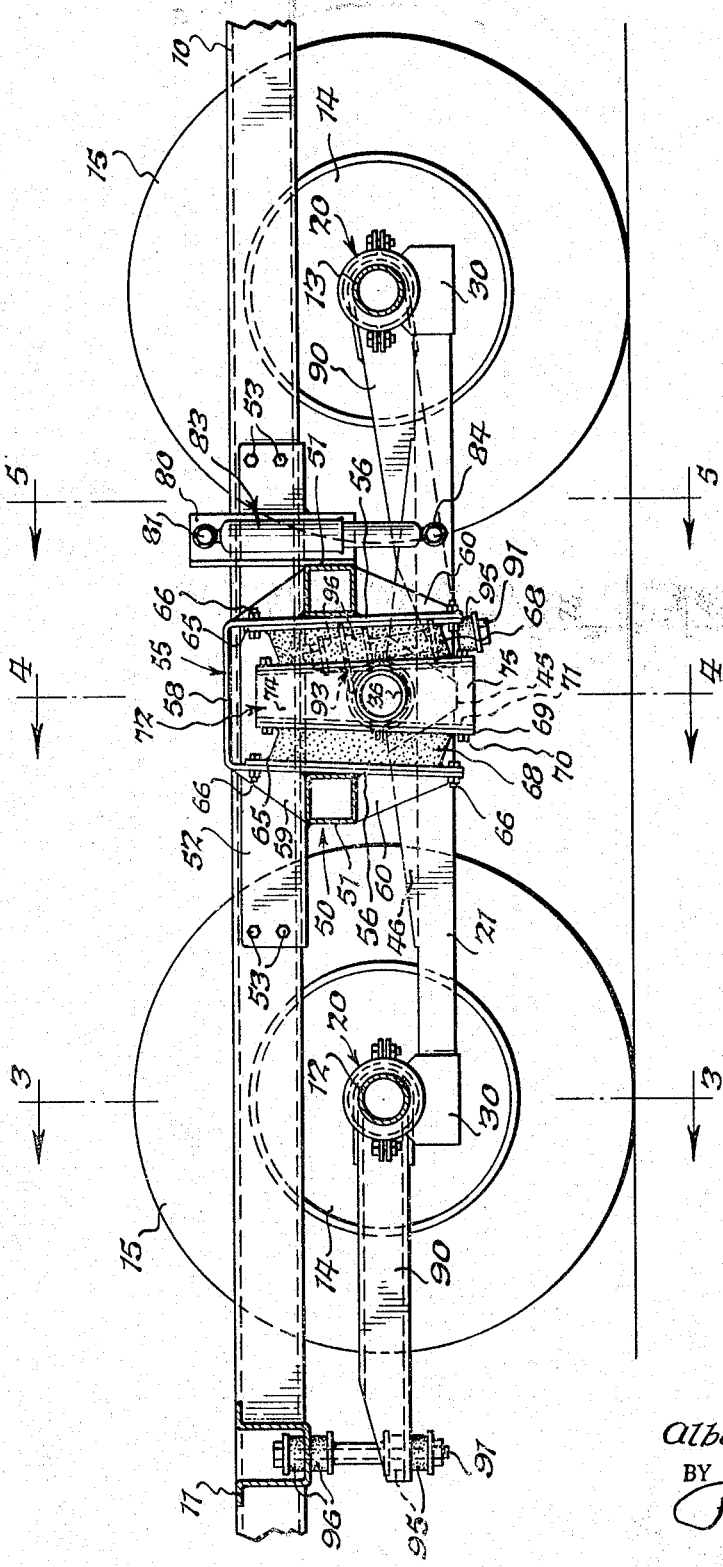

LIGHT DUTY TANDEM AXLE SUSPENSION

Filed Sept. 4, 1964     5 Sheets-Sheet 2

INVENTOR.
Albert F. Hickman
BY
Popp and Sommer
ATTORNEYS.

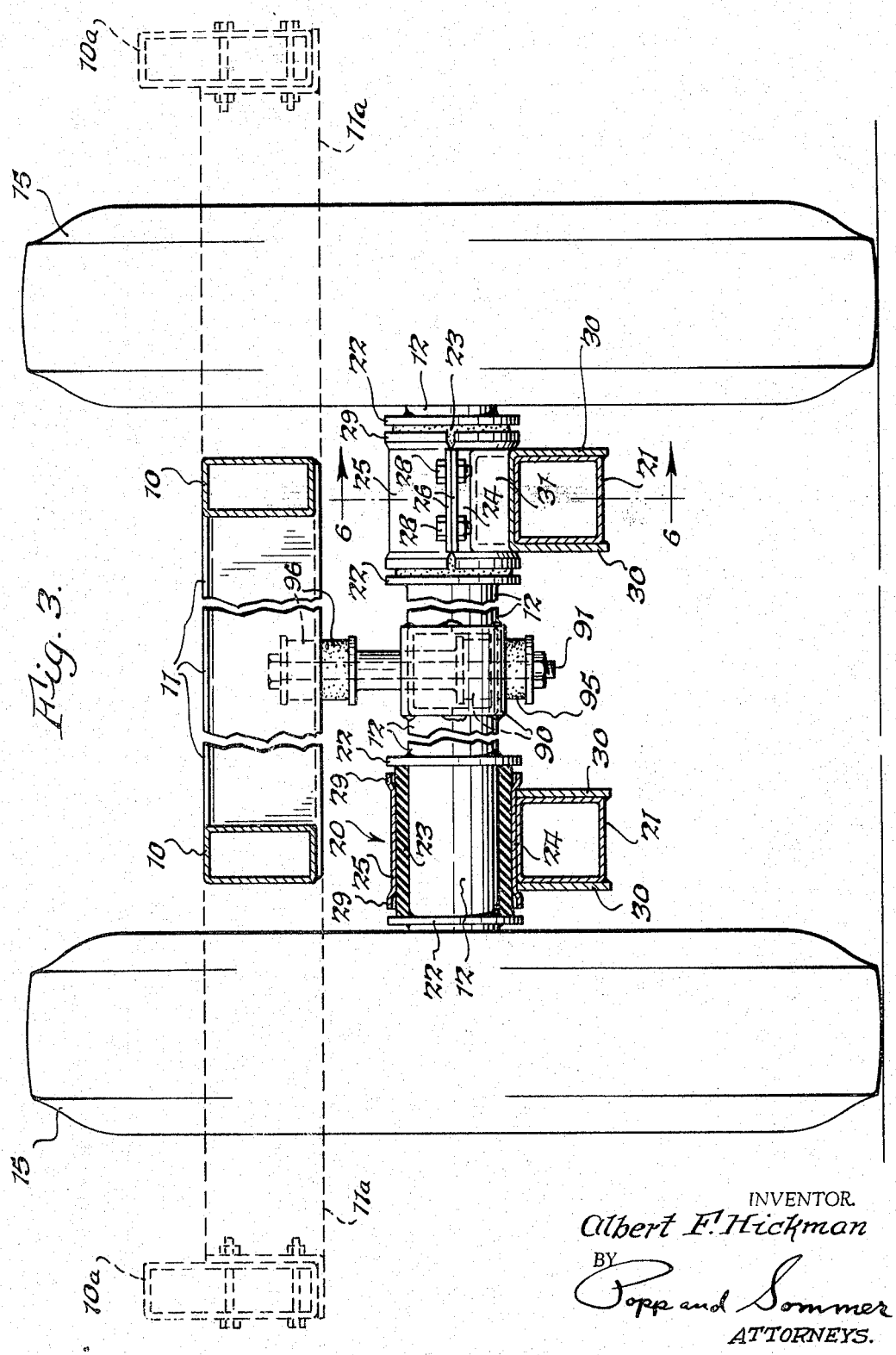

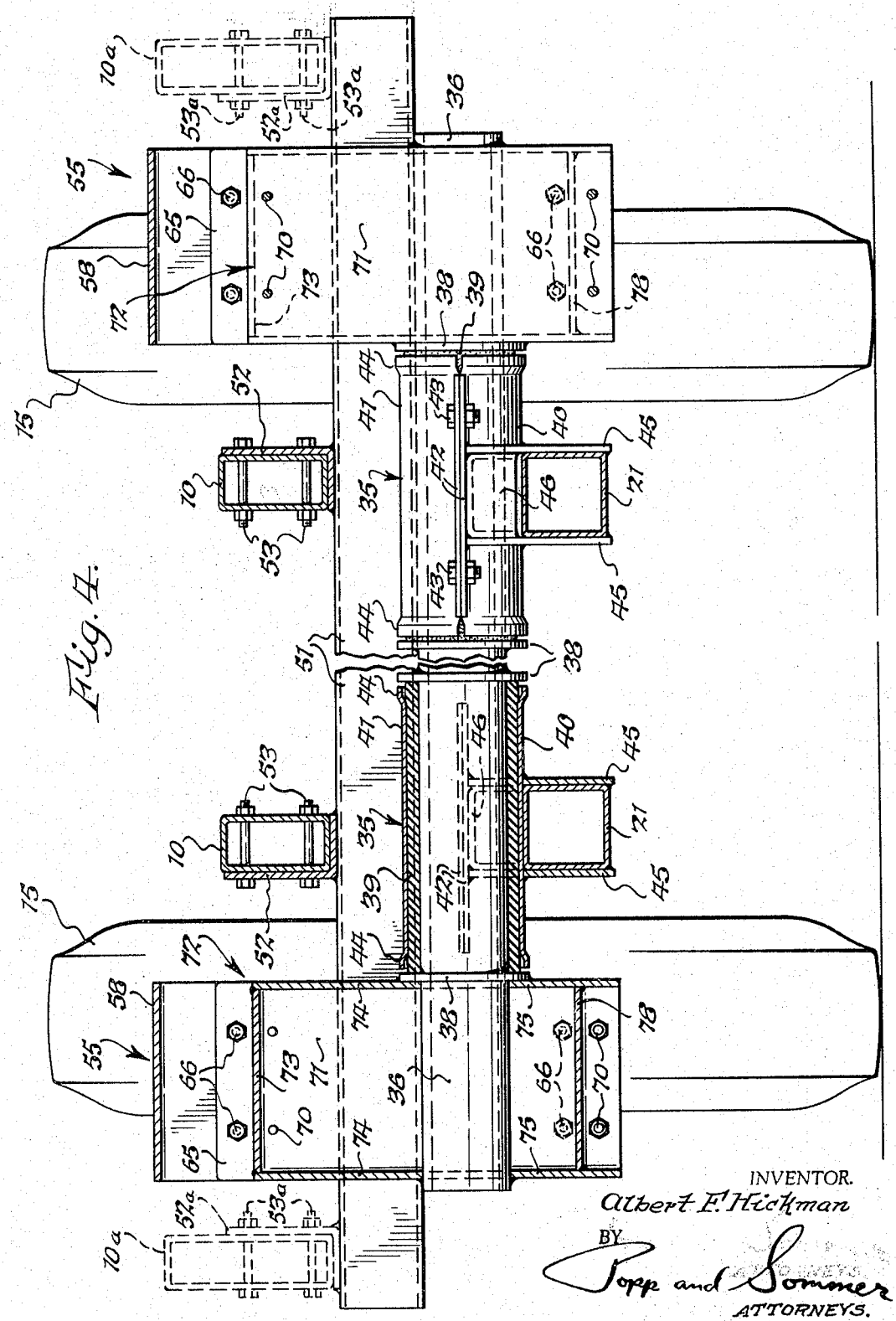

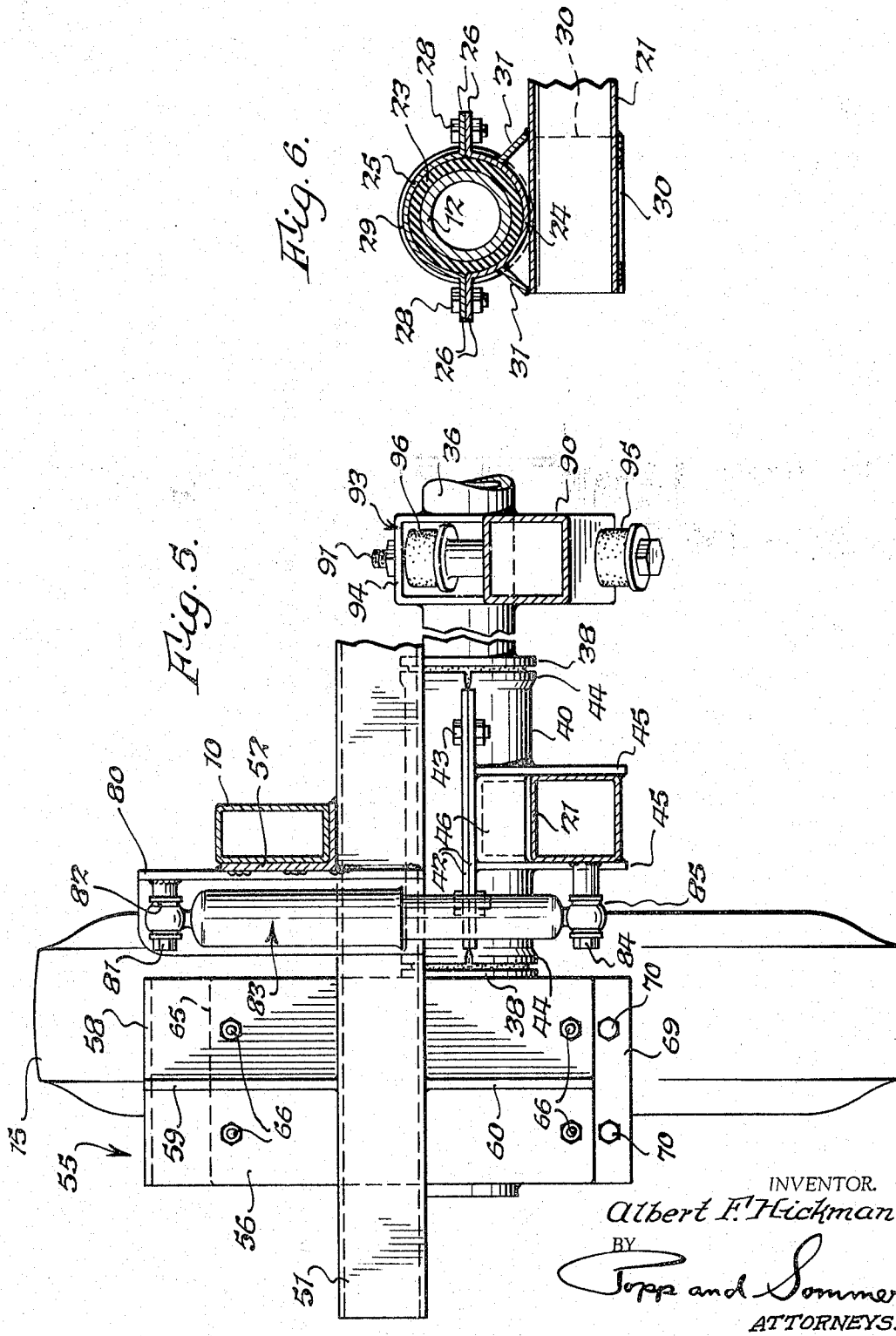

United States Patent Office 3,301,573
Patented Jan. 31, 1967

3,301,573
LIGHT DUTY TANDEM AXLE SUSPENSION
Albert F. Hickman, Eden, N.Y., assignor to Hickman Developments, Inc., Eden, N.Y., a corporation of New York
Filed Sept. 4, 1964, Ser. No. 394,413
4 Claims. (Cl. 280—104.5)

This invention relates to a tandem axle suspension for light duty service, such as for mobile home, camping or light duty trailers and more particularly to such a suspension in which the vertical resilient resistance is provided by shear rubber rectilinear movement type of springs.

One of the objects of the present invention is to provide such a suspension which will permit a large amount of vertical axle movement to provide a vertical ride as soft as load heights will allow and at a low frequency.

Another object is to provide such a suspension which is free from friction but is controlled by an increased resistance to motion in proportion to the amplitude and velocity of vertical main frame movement.

Another object is to provide such a suspension in which lateral and vertical movement of the unsprung components, as well as a slight movement thereof length of the main vehicle frame, are permitted and resiliently resisted, the lateral and vertical resilience being sufficient, both when the vehicle is loaded and unloaded, absorb thrust of the axles laterally of the frame, particularly resulting from one wheel moving up and down relative to the others, thereby to provide increased safety, tire wear, gasoline mileage and stability.

Another object is to provide a gearless compensating means connecting the companion ends of the tandem axles and through which excess load of one wheel is transmitted to its companion wheel on the same side of the vehicle.

Another object is to provide such a spring suspension consisting of compact units which are arranged so as not to interfere with the frame, axle and wheel movement and in which the moving parts are arranged inside and close to the wheels and are high to provide high and wide support for the body on the axles with resulting increased stability.

Another object is to provide such a suspension in which the vertical resilience is provided a shear rubber rectilinear movement type of springs and which suspension can be removed and replaced with the axles, walking beams and wheels as a unit so that field repairs can be avoided and so that also, in the case of mobile homes where the body is left at location for an indefinite period, the entire suspension can be readily removed and returned to service another mobile home in transit.

Another object is to provide such a tandem axle suspension which can have softer springs than those now on the market for equivalent duty and at the same time have greater side sway control through high and wide spring mountings.

Another object is to provide such a suspension which can have many years and hundreds of thousands of miles of carefree operation without repairs or service.

Another object is to provide such a suspension in which all bearings, other than the wheel bearings, can be in the form of rubber bodies, such as bushings or cushions, which are distorted to provide the required movement of the connected parts, such bearings being free from lubrication or service requirements and being reliable for many years of carefree service.

Another object of the invention is to provide such rubber bushed bearings for the walking beams of the suspension which are low in cost and in which the rubber is confined in such manner as to give optimum performance with maximum life. Such rubber bushings also permit lateral movement of the ends of the walking beam but at the same time yieldingly return the walking beams to centered position.

Another object of the invention is to provide, in combination with such rubber bushed bearings for the walking beams, positive or metal-to-metal stops limiting axial displacement of the walking beams.

Another object of the invention is to provide such a suspension which is light in weight, particularly in unsprung weight, this being principally achieved by a cross rod supported by the walking beams and supporting the body through rectilinear movement, shear rubber type of springs.

Another object is to provide shock absorber mountings which are readily accessible and do not add materially to the cost of the suspension.

Another object is to provide such a mounting which permits a skin to be applied over the entire bottom of the main frame of the vehicle.

Other important objects are to provide such a suspension which is low in both initial cost and upkeep; which renders auxiliary devices for the control of side sway unnecessary; and in which periodic vibration of the suspension is dampened out.

Other objects and advantages of the invention will be apparent from the following description and drawings in which:

FIG. 1 is a fragmentary vertical section taken on line 1—1, FIG. 2 and showing the suspension embodying the present invention in side elevation, the opposite side of the suspension being identical in construction.

FIG. 2 is a diminutive fragmentary top plan view of the suspension embodying the present invention and showing the same supporting the main frame of a vehicle.

FIGS. 3, 4 and 5 are enlarged vertical transverse sections taken on the correspondingly numbered lines of FIG. 1.

FIG. 6 is a fragmentary vertical section taken on line 6—6, FIG. 3.

The invention is illustrated as being in the form of a light duty tandem axle suspension adapted for narrow or wide bodied trailers or the like. Where the trailer body is narrow its main longitudinal side frame beams 10 are shown as spaced closely together as indicated by full lines in FIGS. 2, 3 and 4. Each of these main longitudinal side frame bars 10 is shown as being of box or rectangular tubular form in cross section and as being connected by a cross channel bar 11 arranged in front of the suspension embodying the present invention. Where the trailer body is wide its main longitudinal side frame beams 10a are shown as spaced further apart as indicated by dotted lines in FIGS. 2, 3 and 4. Each of these main longitudinal side frame bars 10a is shown as being of box or rectangular tubular form in cross section and as being connected by a cross channel bar 11a arranged in front of the suspension embodying the present invention.

In either case, the frame is shown as supported by a pair of tandem axles, the front tandem axle being designated at 12 and the rear tandem axle being designated at 13 and each of which in turn is supported at its opposite ends by wheels 14, these wheels being rotatably secured on these axles and each including a rubber tire 15.

The construction of the tandem axle spring suspension at the right hand side of the frame is substantially the same as the construction at the left hand side of the frame and hence a description of the spring suspension at one side of the frame will be deemed to apply to both sides, the same reference numerals being employed.

Each end of each of the axles is connected by a rubber bushed bearing indicated generally at 20, to one end of a horizontal walking beam 21, these rubber bushed bearings being arranged adjacent the inner faces of the tires 15. Each walking beam 21 is preferably of rectangular tubular form in cross section having vertical side walls and horizontal top and bottom walls. When the suspension is used to support a narrow bodied frame 10, 11 and the walking beams being arranged under the corresponding longitudinal side frame bars 10 of the walking beam. While each rubber bushed bearing 20 can be of any suitable construction, as best shown in FIGS. 3 and 6, each is shown as comprising a pair of spaced end abutment rings 22 welded to each end of each axle and confining between them a rubber bushing 23 which embraces the axle. The bottom of the periphery of each rubber bushing is compressively embraced by a semicylindrical metal lower half bearing clamping member 24 and the top of the periphery of each rubber bushing is compressively embraced by a semicylindrical upper half bearing clamping member 25, these half bearing clamping members 24, 25 having horizontally outwardly projecting flanges 26 along their opposite longitudinal edges and which flanges are secured together by bolts 28 so as to compress the rubber bushing 23 between the half bearing clamping members 24, 25. In order to accommodate the displacement of the rubber of the bushings 23 resulting from such compression the opposite ends of the half bearing clamping members 24, 25 are of enlarged bell shape as indicated at 29, and the end edges of these half bearing clamping members 24, 25 are in spaced relation to the abutment rings 22 welded to the axle end.

The lower half bearing clamping member 24 has spaced depending side plates 30 welded thereto and embracing the vertical side walls of, and also welded to, the corresponding end of the walking beam 21. Additionally, diagonal reinforcing plates 31 can be welded to project radially from opposite sides of each lower half bearing clamping member 24 with their top edges welded thereto, the lower edges of each of these reinforcing plates being welded to the top face of the corresponding walking beam 21 and the opposite ends of each of these plates being welded to the corresponding side plates 30.

At its center, each walking beam 21 is connected by a rubber bushed bearing, indicated generally at 35 to a cylindrical cross rod in the form of a cylindrical tube 36.

While each rubber bushed bearing 35 can be of any suitable construction, as best shown in FIGS. 4 and 5, each comprises a pair of spaced end abutment rings 38 welded to each end of the cross rod 36 and confining between them a rubber bushing 39 which embraces the cross rod. The bottom of the periphery of each rubber bushing is compressively embraced by a semicylindrical metal lower half bearing clamping member 40 and the top of the periphery of each rubber bushing is compressively embraced by a semicylindrical upper half bearing clamping member 41, these half bearing clamping members 40, 41 having horizontally outwardly projecting flanges 42 along their opposite longitudinal edges and which flanges are secured together by bolts 43 so as to compress the rubber bushing 39 between the half bearing clamping members 41, 42. In order to accommodate the displacement of the rubber of the bushings 39 resulting from such compression, the opposite ends of the half bearing clamping members 40, 41 are of enlarged bell shape, as indicated at 44, and the end edges of these half bearing clamping members 41, 42 are in spaced relation to the abutment rings 38 welded to the cross tube end.

Each lower half bearing clamping member 40 has spaced depending side plates 45 welded thereto and embracing the vertical side walls of and also welded to the center of the companion walking beam 21. Additionally, a pair of inverted wedge-shaped channels 46 severally at opposite ends of each walking beam 21 have their opposing ends fitted between the side plates 45 and their opposing edges welded to the lower half bearing clamping member 40, with their bottom edges welded to the top wall of the walking beam 21.

The opposite ends of the cross rod 36 resiliently support the opposite ends of a subframe structure, indicated generally at 50, which in turn is bolted or otherwise secured to the main longitudinal side frame bars 10 or 10a of the main frame. This subframe structure comprises a pair of transversely spaced cross bars 51 which are preferably of rectangular tubular form in cross section, as best shown in FIG. 1, and arranged equidistant from and in a horizontal plane above the cross rod 36. These cross bars are removably connected the main frame by frame brackets. With the narrow main frame illustrated in full lines by the bars 10 and 11, these frame brackets are in the form of angle bars 52 having a horizontal bottom flange resting on and welded to connect the cross bars ends 51, as best shown in FIGS. 1, 4 and 5, and having an upstanding flange ararnged along the outside face of the corresponding main longitudinal side frame beam 10 and secured thereto by bolts 53 as best shown in FIGS. 1, 2, 4 and 5. With the wider frame 10a, 11a shown in dotted lines the frame brackets 52a, also shown in dotted lines, are of similar construction but welded to connect the outboard extremities of the cross bars 51 to fit and be bolted by bolts 53a to the more widely spaced main longitudinal side frame beams 10a of the wider vehicle as best shown in FIGS. 2 and 4.

An important feature of the invention resides in the resilient connection between each end of the cross rod 36 with the corresponding ends of the cross bars 51 of the subframe structure 50. To this end an inverted U-shaped frame bracket, indicated generally at 55, spans the space between the ends of the cross bars 51 at each side of the vehicle and is secured thereto. These frame brackets are arranged exteriorly of the main longitudinal side frame bars 10 of a narrower main frame and interiorly of the main longitudinal side frame beams 10a of a wider main frame. Each frame bracket 55 is also in a vertical plane intersecting the tires 15 of the companion pair of wheels 14 and its outboard extremity projects, as best shown in FIG. 2, beyond the plane of the outboard circular faces of these tires to provide wide spring centers for the suspension. Each frame bracket comprises a pair of upright legs in the form of plates 56 welded to the opposing sides of the cross bars 51 as best shown in FIGS. 1 and 5 and connected at their upper ends by a horizontal cross plate 58. The side plates 56 are preferably braced against the cross bars 51 by diagonal brace plates or ribs 59, 60 welded thereto as illustrated in FIGS. 1 and 5 and the opposing faces of the upright side plates 56 are generally parallel with the axis of the cross rod 36 but converge upwardly with reference to each other as best shown in FIG. 1.

A vertically elongated rectangular metal plate 65 is secured, as by corner bolts 66, to each of the opposing faces of the upright side plates 56. To the face of each rectangular metal plate 65 remote from the upright side plates 56 is vulcanized a rubber body 68 which is generally rectangular in a plane parallel with these plates. The opposite face of each of these rubber bodies is vulcanized to a vertically elongated rectangular metal plate 69 which is generally parallel with the companion plate 65. Each metal plate 69 is secured, as by corner bolts 70, to the corners of an upright rectangular plate 71 forming part of a wedge-shaped bracket 72 fixed to the corresponding end of the cross rod 36.

Each of these wedge-shaped cross shaft brackets 71 also includes a horizontal top plate 73 connecting and welded to the upper edges of its upright bracket plates 71; inner and outer upper vertical plates 74 welded to the corresponding edges of the plates 71, 73 and also conforming and welded to the top of the cross shaft 36; inner and outer vertical plates 75 welded to the inner and outer edges of the plates 74 and also conforming to and welded to the bottom of the cross rod 36 and a horizontal bottom plate 78 enclosing the bottom of the bracket structure.

As best shown in FIGS. 1, 2 and 5 a shock absorber bracket 80 in the form of an upright angle iron has one flange welded to each frame bracket 52 and to the rear face of the rearmost cross bar 51 of the subframe structure 50, this upright angle iron being set into the corner between this frame bracket and cross bar. To the upper end of each shock absorber bracket 80 is secured, as by a pivot pin 81 and surrounding a rubber bushing 82, the upper end of a telescopic hydraulic shock absorber 83, the lower end of which is pivoted, by a pivot pin 84 and surrounding rubber bushing 85, to the outer side wall of the walking beam 21 closer to its center than to its adjacent outboard end.

The suspension is also shown as including axle torque arms 90 which are effective against brake torque reactions. Each torque arm 90 is welded to the corresponding axle 12, 13 to project horizontally toward the front end of the vehicle. The torque arm 90 of the rear tandem axle 13 can be connected by an upright rod 91 to the cross rod 36, this cross rod having welded thereto for this purpose a bracket 93 which includes a rearwardly projecting flange 94 through which the upright rod 91 extends, as best shown in FIG. 5. Preferably the vertical force of this rearward torque arm is transmitted through a pair of rubber cushions 95 to the upright rod 91 and the vertical force of this upright rod is delivered to the bracket 93 by a pair of rubber cushions 96.

The outboard end of the forward torque arm 90 can be connected to the main frame cross bar 11 or 11a in the same manner, that is, as best shown in FIGS. 1 and 3, by an identical upright rod 91 to the main frame cross bar 11 or 11a through which this forward upright rod 91 extends. Again preferably the vertical force of this torque arm is transmitted through a pair of rubber cushions 95 to the upright rod 91 and the vertical force of this upright rod is delivered to the main frame cross bar 11 or 11a through a pair of rubber cushions 96.

*Operation*

In the operation of the suspension the upward movement of one end of, say, the front tandem axle 12 through the corresponding rubber bushed bearing 20 effects upward movement of the forward end of the corresponding walking beam 21.

This upward movement of the forward end of this walking beam 21 raises its rock sleeve 40, 41 (FIGS. 2 and 4) at the center of the walking beam and which is journalled through the rubber bushing 39 on the corresponding end of the cross rod 36. This rubber bushing 39 is of sufficient radial thickness to permit the required rocking of the walking beam 21 and provides a frictionless bearing which is free from lubrication requirements. The two rubber bushings 39 hold the walking beams at the outer ends of the cross rod 36, but in the event of extreme horizontal lateral force against the vehicle body, the bell-shaped ends 44 of the rock sleeves 40, 41 engage the rings 38 welded to this cross rod so as to provide a positive metal-to-metal stop in the event of such extreme conditions. These bell-shaped ends 38 of the rock sleeves 40, 41 also permit a limited amount of horizontal transverse movement of the ends of the walking beams but engage the welded rings 38 to prevent any such movement to excess.

This upward movement of one end of the cross rod 36 raises the corresponding wedge-shaped bracket 72 fixed to this end of the cross rod. This raises the upright side plates 69 thereby to distort upwardly the opposing sides of the corresponding pair of rubber bodies 68. Accordingly this force is transmitted to the frame bracket 55 through these rubber bodies which are distorted to provide resilient support for the frame 10, 11 or 10a, 11a. The rebound force of the rubber body 61, of course, restores the forward wheel to its original position and in this rebound action the corresponding shock absorber 83 is effective to retard such rebound action.

It will be noted that this action of the suspension is friction free, the force being transmitted from the axles to the walking beams 21 via the rubber bushings 23; the force from each walking beam 21 being transmitted to the cross rod 36 via the corresponding rubber bushing 39; and the force from each end of the cross rod 36 being transmitted to the axle bracket 55 via the rubber bodies 68.

Lateral cushioning of the axles 12, 13 is provided by their individual bushings 23, the rock sleeves 24, 25 surrounding these rubber bushings being spaced axially from the rings 22 welded to the axles, and lateral axle movement is also permitted by the rubber sleeves 39 carrying the cross rod 36 and which permit limited lateral movement of the outboard ends of the walking beams 21. Lateral cushioning of the axles is also provided by the rubber bodies 68 which permit a limited lateral or axial movement of the cross rod 36 supporting these axles.

The torque arms 90 fixed to the axles 12, 13 adequately resist all brake torque reactions and through the rods 91 and rubber cushions 95, 96 do not resist axle movement in any direction.

By the high and wide mounting provided by the rubber bodies 68 excellent side sway control is achieved with a soft, low frequency ride which these rubber bodies 68 provide.

The rubber bushing 39 for each walking beam constitute an important feature of the suspension these rubber bushings being thick enough to wind up or flex in response to the oscillation of the walking beams, and this wind-up or torsional stress in addition contributes to holding all four wheels 14, 15, and hence the unsprung weight of the suspension, on the road, particularly when traveling along without a load and at high speeds. Without a load, the body and its contents (not shown) carried by the vehicle frame 10, 11 or 10a, 11a is less effective in keeping the wheels 14, 15, particularly individual wheels on the road. The torsionally flexed rubber bushings 23 utilize the weight of the unsprung mass of the suspension to hold the individual wheels on the road. This is accomplished by the stressed rubber bushings 23 as follows, when traveling unladen at high speed.

When one or two wheels 14, 15 rise, all the rubber bushings 23 are twisted or flexed against their internal resistance, and hence the upward movement of the rising wheels is not only not accelerated but instead is resiliently resisted by the bushings 23 and the reactive force tends to return the rising wheel to contact with the road. These rubber bushings are a part of the unsprung mass and hence this resistance and reactive force of the rubber bushings is a function of the unsprung mass and is independent of both the main rectilinear movement rubber body springs 68 and also the sprung mass which, as pointed out above, can be of very reduced effectiveness when empty in holding the wheels on the road.

By "rubber" as used in the accompanying claims is meant natural rubber, synthetic rubber or mixtures of natural and synthetic rubber.

From the foregoing it will be seen that the present invention achieves the objects and the advantages set forth, and is a sturdy low cost suspension free from upkeep and service problems.

What is claimed is:

1. A tandem axle spring suspension adapted to be interposed between a vehicle frame and a pair of tandem axles each having rubber tired wheels journalled at the ends thereof, comprising a walking beam arranged at each side of said frame and extending lengthwise thereof close to the inner vertical faces of the corresponding pair of tires, a horizontal cross rod extending transversely of said frame into the space between said tires at each side of said vehicle and with its ends arranged adjacent the central parts of said walking beams, bearing means journalling said cross rod near the respective ends thereof on said central parts of said walking beams, a cross rod bracket secured to each end of said cross rod and having upright faces facing in opposite directions, a frame bracket rigidly connected to said frame and having upright faces severally opposing the corresponding faces of said cross rod bracket, a rubber body secured at its opposite upright faces to each companion pair of upright faces of said cross rod bracket and frame bracket and arranged substantially wholly exteriorly of the vertical plane of said inner vertical faces of the corresponding pair of tires, and said rubber bodies being distorted in upright shear in supporting each frame bracket on its cross rod bracket, and means movably connecting each end of each walking beam with a corresponding axle end.

2. A tandem axle spring suspension as set forth in claim 1 additionally including a subframe including a pair of spaced cross bars on opposite sides, adjacent to and parallel with said cross rod, means connecting the opposite ends of said cross bars with said vehicle frame, said cross bars having ends projecting from said vehicle frame into said space between the tires at each side of the vehicle, said frame bracket at each side of the vehicle bridging the space between the corresponding projecting ends of said cross bars and being exclusively connected to the frame through said projecting ends of said cross bars.

3. A tandem axle spring suspension as set forth in claim 2 wherein said rubber bodies are arranged in the space between the corresponding ends of said cross bars and substantially wholly exteriorly of the vertical plane of said inner vertical faces of the corresponding pair of rubber tires.

4. A tandem axle spring suspension adapted to be interposed between a vehicle frame and a pair of tandem axles each having rubber tired wheels journalled at the ends thereof, comprising a walking beam arranged at each side of said frame and extending lengthwise thereof, means movably connecting each end of each walking beam with a corresponding axle end, a horizontal cross rod extending transversely of said frame with its ends arranged adjacent the central parts of said walking beams, bearing means journalling said cross rod near the respective ends thereof on said central parts of said walking beams, cross rod bracket means rigidly secured to each end of said cross rod, frame bracket means rigidly secured to each side of said frame and each having portions arranged fore-and-aft of the respective cross rod bracket, and means forming the sole connection, under all conditions of normal operation, between said cross rod bracket means and said frame bracket means consisting exclusively of a first vertically elongated metal plate fixed to each of said axle bracket portions generally parallel with the axis of said cross rod and extending above and below a horizontal plane intersecting said axis and being in upwardly converging relation to a vertical plane intersecting said axis, at least one substantially solid resilient rubber block vulcanized to the face of each of said first plates opposing said axis and also arranged above and below a horizontal plane intersecting said axis, and a second vertically elongated metal plate generally parallel with each companion first plate and vulcanized to the side of the companion rubber block opposite from its said first plate and rigidly connected to said cross rod bracket, said substantially solid rubber blocks serving to compel said cross rod to move only in a vertical plane with reference to the vehicle frame whereby said walking beams are maintained substantially parallel with the line of travel of the vehicle.

References Cited by the Examiner

UNITED STATES PATENTS

| 2,103,381 | 12/1937 | Perkins | 280—104.5 |
| 2,995,383 | 8/1961 | Barker | 267—63 X |
| 3,129,953 | 4/1964 | Hickman | 280—104.5 |

FOREIGN PATENTS 872,008   3/1953   Germany.

BENJAMIN HERSH, *Primary Examiner.*

P. GOODMAN, *Assistant Examiner.*